US010955106B1

(12) United States Patent
Lee

(10) Patent No.: US 10,955,106 B1
(45) Date of Patent: Mar. 23, 2021

(54) HEAD LAMP FOR VEHICLE

(71) Applicant: HYUNDAI MOBIS CO., LTD., Seoul (KR)

(72) Inventor: Hyun Soo Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 16/814,795

(22) Filed: Mar. 10, 2020

(30) Foreign Application Priority Data

Sep. 27, 2019 (KR) ........................ 10-2019-0119633

(51) Int. Cl.

*G02B 3/00* (2006.01)
*F21S 41/63* (2018.01)
*F21S 41/143* (2018.01)
*F21S 41/40* (2018.01)
*F21V 5/04* (2006.01)
*F21S 41/20* (2018.01)
*F21W 102/135* (2018.01)

(52) U.S. Cl.

CPC ........... *F21S 41/635* (2018.01); *F21S 41/143* (2018.01); *F21S 41/285* (2018.01); *F21S 41/40* (2018.01); *F21V 5/04* (2013.01); *F21W 2102/135* (2018.01)

(58) Field of Classification Search

None

See application file for complete search history.

(56) References Cited

U.S. PATENT DOCUMENTS 9,915,404 B1* 3/2018 Sun ........................ F21S 41/24
2015/0036373 A1* 2/2015 Chen ...................... G02F 1/153 362/516
2016/0061398 A1* 3/2016 Lee ........................ F21S 41/43 362/516
2016/0341384 A1* 11/2016 Hoshino ................ F21S 41/17
2017/0138555 A1* 5/2017 Hirasawa ............... F21S 41/14
2017/0292671 A1* 10/2017 Gousset-Rousseau ...................... F21S 41/143
2018/0058652 A1* 3/2018 Taudt ...................... F21S 41/24
2018/0216794 A1* 8/2018 Marchal ................. F21S 41/25
2019/0070997 A1* 3/2019 Mouri ..................... F21S 41/47

FOREIGN PATENT DOCUMENTS

EP 3208529 A1 * 8/2017 ........... F21S 41/255
KR 10-1713159 B1 3/2017
KR 10-2018-0078951 A 7/2018

OTHER PUBLICATIONS

Office Action of Korean Patent Application No. 10-2019-0119633—5 pages. (dated Nov. 25, 2020).

* cited by examiner

*Primary Examiner* — Elmito Breval

(74) *Attorney, Agent, or Firm* — Knobbe Martens Olson & Bear LLP

(57) ABSTRACT

A head lamp for a vehicle may include: a light source unit configured to emit light; an optic unit configured to control the light, emitted from the light source unit, to be emitted to form a plurality of optical focuses; a shield unit disposed to form a cutoff line on the plurality of optical focuses; a first lens array unit disposed on an emission side of the shield unit and having a plurality of first lenses arranged therein; and a second lens array unit disposed on an emission side of the first lens array unit and having a plurality of second lenses arranged therein.

9 Claims, 5 Drawing Sheets

HEAD LAMP FOR VEHICLE

CROSS-REFERENCE TO RELATED APPLICATION

The present application claims priority under 35 U.S.C. § 119(a) to Korean Patent Application No. 10-2019-0119633 filed on Sep. 27, 2019 in the Korean Intellectual Property Office, which is incorporated herein by reference in its entirety.

BACKGROUND

1. Technical Field

Embodiments of the present disclosure relate to a head lamp for a vehicle, and more particularly, to a head lamp for a vehicle, which can reduce the size of an optical system and increase a diffusion angle of light.

2. Related Art

In general, a vehicle has head lamps installed on both sides of the front thereof. The head lamp includes a low-beam light source and a high-beam light source. The head lamp implements a lighting function capable of forming a specific pattern around a vehicle or on the road. For example, the head lamp may implement a function of emitting light around the vehicle when a driver approaches the vehicle or opens a door.

The head lamp includes a reflector for reflecting light emitted from an LED and a shield unit for separating the light reflected by the reflector into a low beam and a high beam. The low beam and the high beam are emitted to the front of the vehicle through an aspheric lens.

In the related art, however, since the aspheric lens is applied to the head lamp, the size of the head lamp is increased, and the manufacturing cost is increased.

Since a light distribution pattern is formed through one aspheric lens, there is a limitation in implementing the design of the head lamp. Furthermore, the head lamp also has a limitation in implementing a surface emission image.

The related art of the present invention is disclosed in Korean Patent No. 10-1713159 registered on Feb. 28, 2017 and entitled "Head Lamp for Vehicle".

SUMMARY

Various embodiments are directed to a head lamp for a vehicle which can reduce the size of an optical system, and increase a diffusion angle of light.

In an embodiment, a head lamp for a vehicle may include: a light source unit configured to emit light; an optic unit configured to control the light, emitted from the light source unit, to be emitted to form a plurality of optical focuses; a shield unit disposed to form a cutoff line on the plurality of optical focuses; a first lens array unit disposed on an emission side of the shield unit and having a plurality of first lenses arranged therein; and a second lens array unit disposed on an emission side of the first lens array unit and having a plurality of second lenses arranged therein.

The optic unit may include: an optic body configured to control the light, emitted from the light source unit, to be emitted in parallel to one plane; and an optic emission part configured to change an optical angle of the light emitted from the optic body such that the plurality of optical focuses gather on the one plane.

The optic emission part may be formed as one body with the optic body.

The optic emission part may eccentrically form an optical axis of light, which converges to some of the optical focuses, at an angle of 20 to 30°.

The optic emission part may adjust the optical angle such that the plurality of optical focuses are located on a straight line of the one plane.

The optic emission part may adjust focal distances of the plurality of optical focuses to adjust the diffusion angle of the light emitted from the first and second lenses.

The first and second lenses may correspond one-to-one to each other to constitute a lens set, and an optical channel may be formed for each of the lens sets.

The light which converges to some of the optical focuses may penetrate the lens set and diffuse to the neighboring optical channel.

The optic emission part may be disposed at every two or more first lenses.

The shield unit may have a shield layer formed on a surface thereof to form the cutoff line.

In accordance with the embodiment of the present disclosure, since the optic unit emits light to form the plurality of optical focuses between the first lens array unit and the optic unit, the plurality of optical focuses may be located on one plane or located very close to one plane. Therefore, the plurality of optical focuses may be calibrated to be located close to the first lens array unit, thereby increasing the diffusion angle of light.

Furthermore, since the optic body has the optic emission part, the optic emission part may increase the diffusion angle of the light to about 30° by eccentrically changing the optical angle of the light.

DETAILED DESCRIPTION

Hereinafter, a head lamp for a vehicle will be described below with reference to the accompanying drawings through various examples of embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
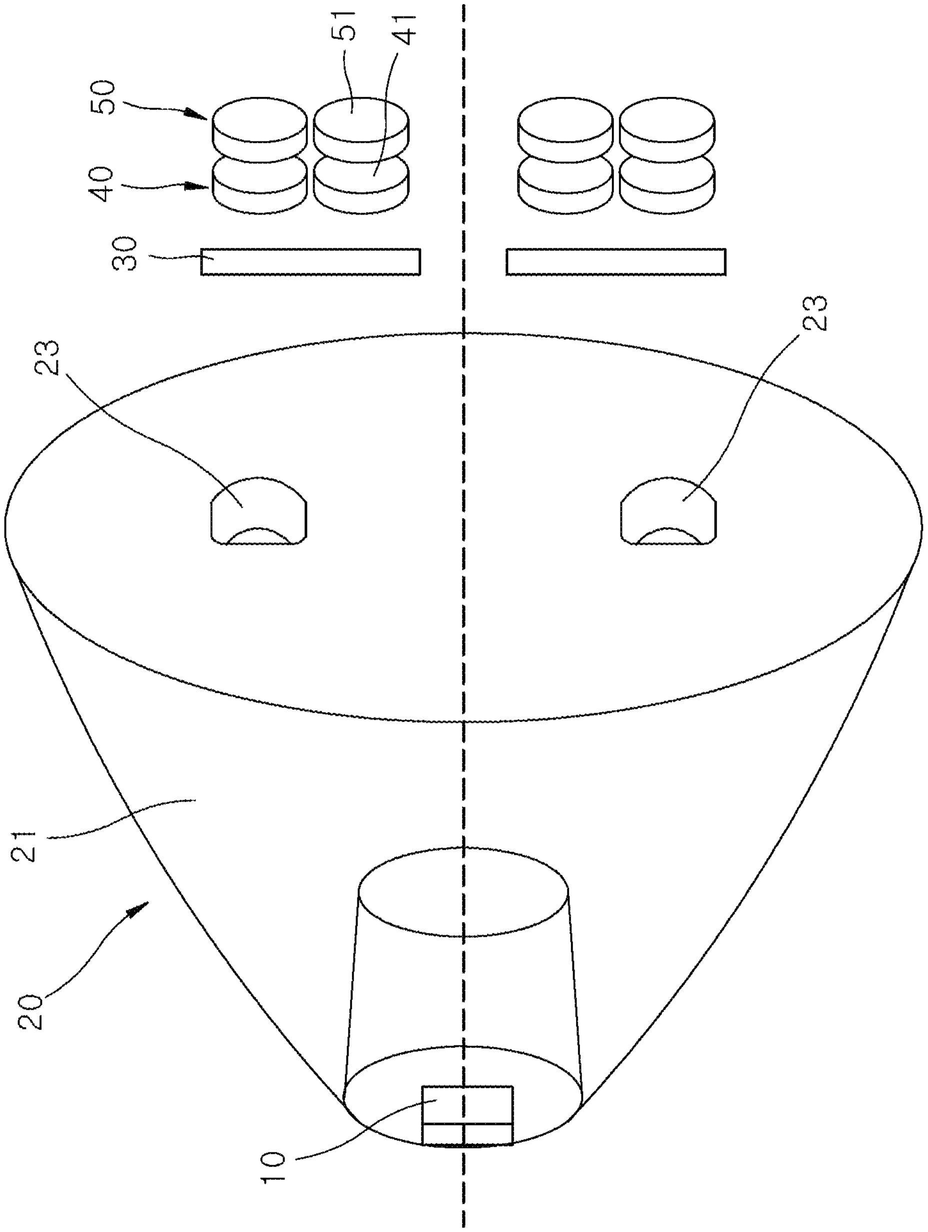
FIG. 1 is a perspective view schematically illustrating a head lamp for a vehicle in accordance with an embodiment of the present disclosure.
Figure 2:
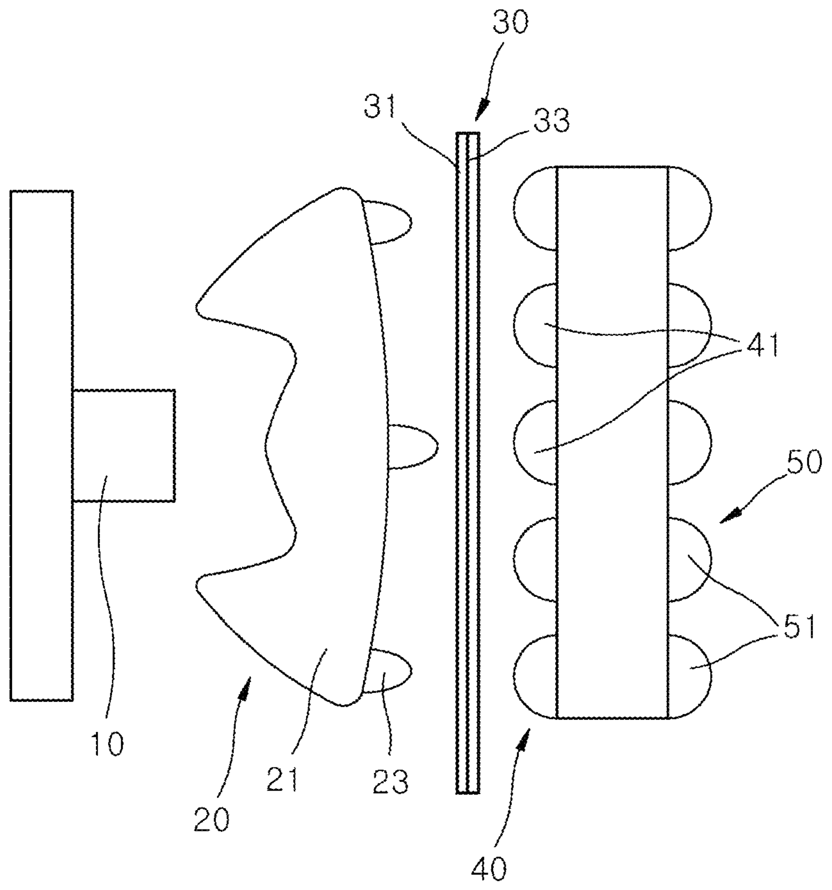
FIG. 2 is a configuration diagram schematically illustrating the head lamp for a vehicle in accordance with the embodiment of the present disclosure.
Figure 3:
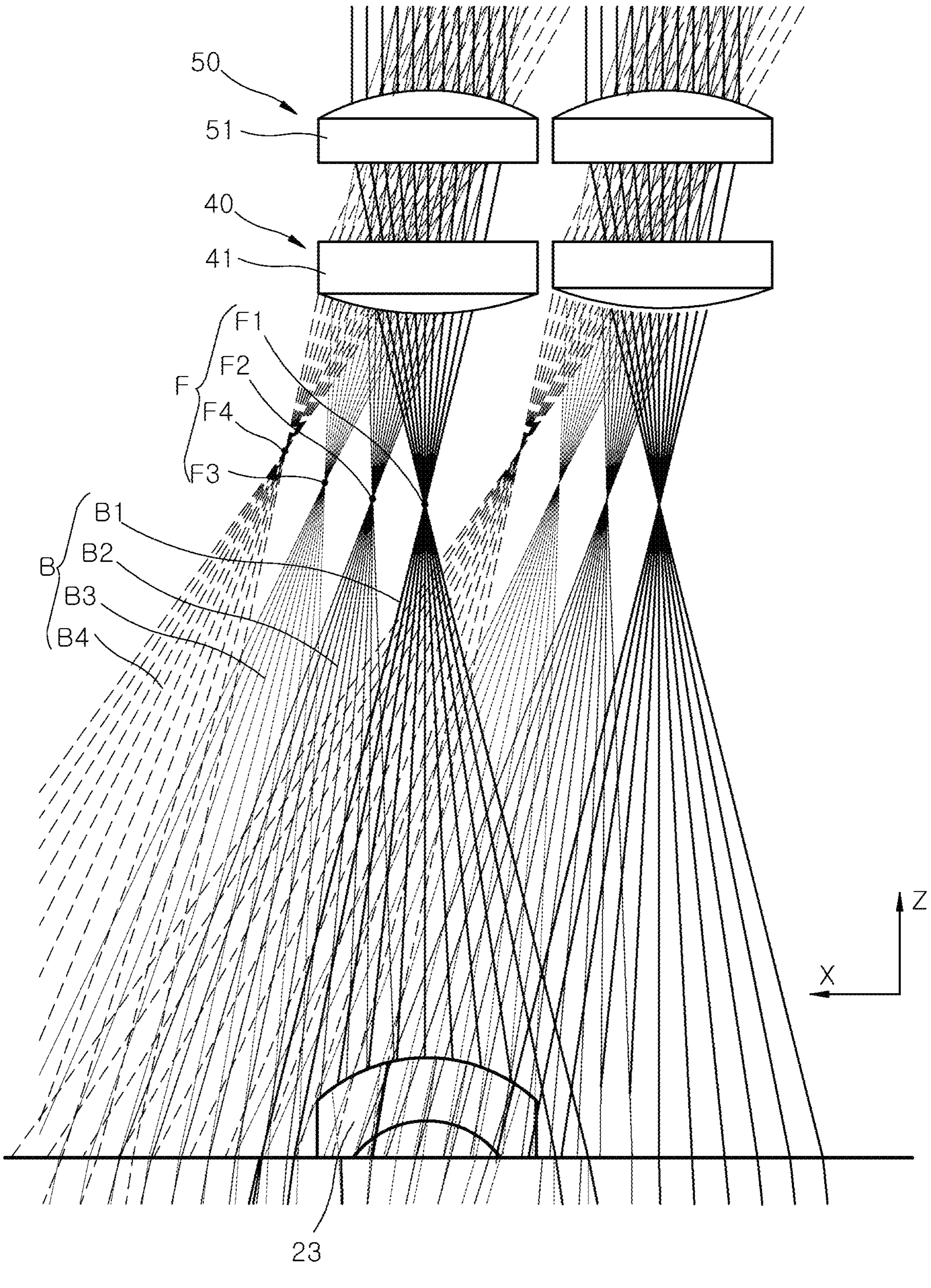
FIG. 3 is a configuration diagram illustrating an example in which optical focuses are formed in the head lamp for a vehicle in accordance with the embodiment of the present disclosure.
Figure 4:
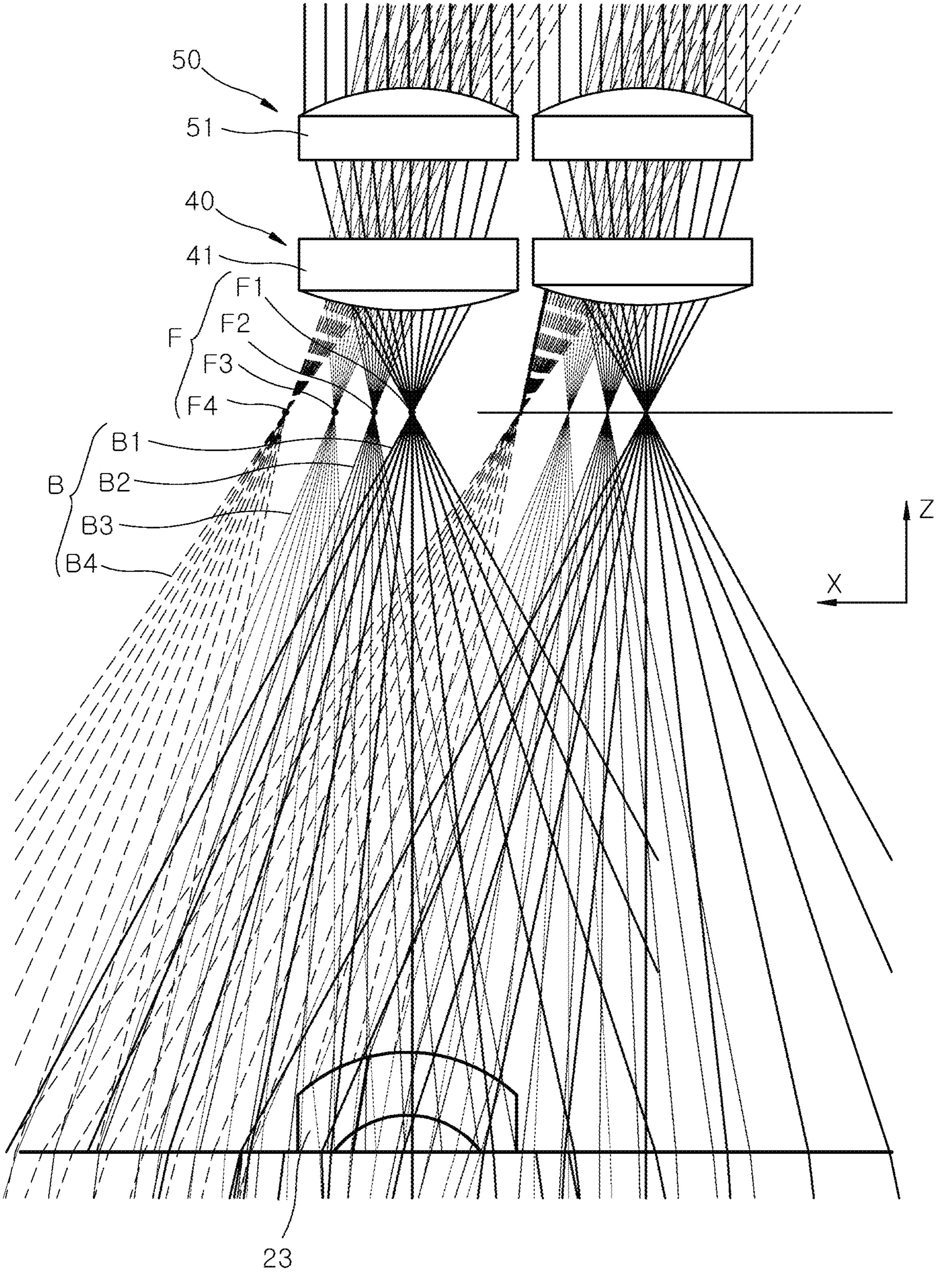
FIG. 4 is a configuration diagram illustrating another example in which optical focuses are arranged in a line in the head lamp for a vehicle in accordance with the embodiment of the present disclosure.
Figure 5:
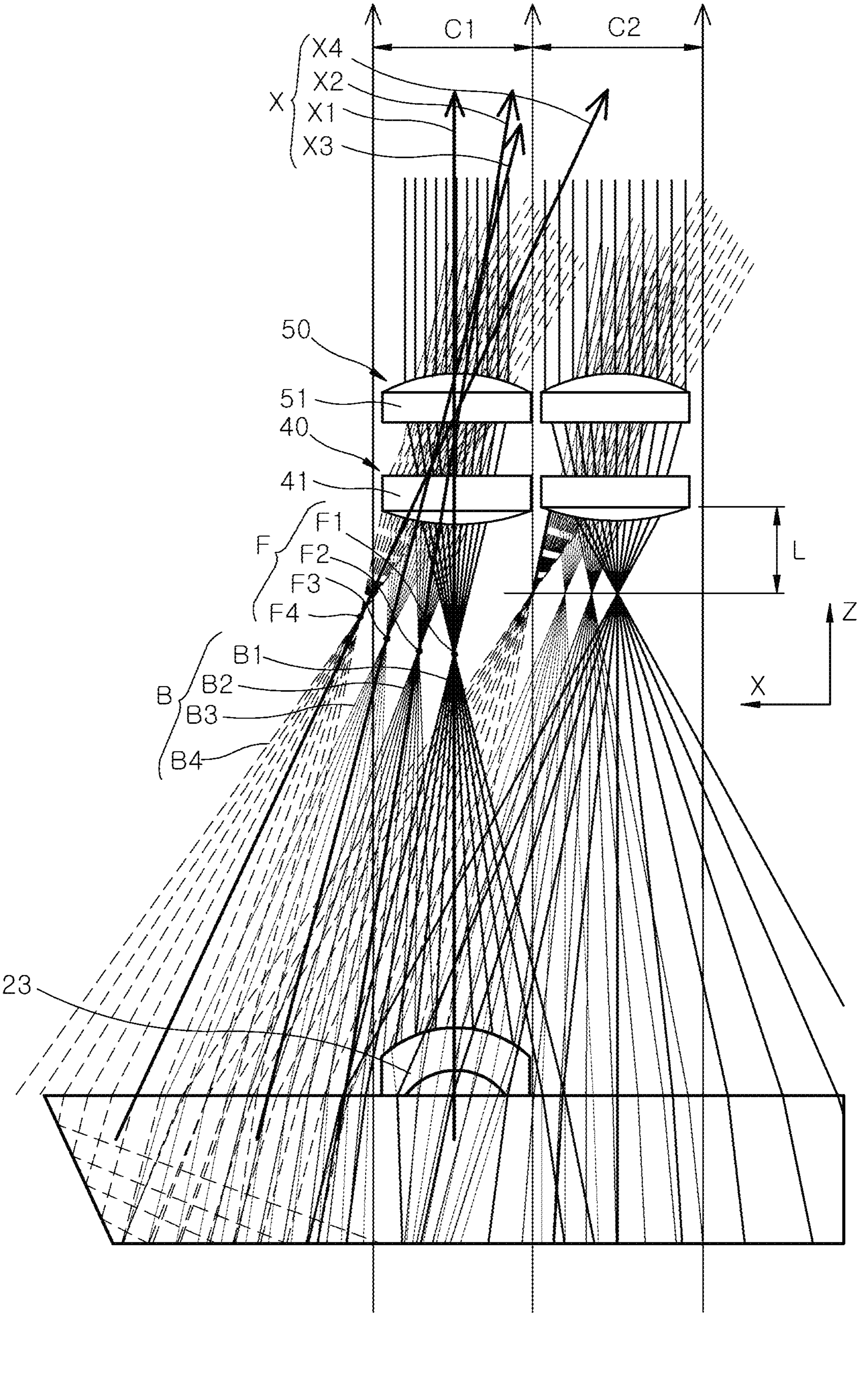
FIG. 5 is a configuration diagram illustrating an optical axis of light in the head lamp for a vehicle in accordance with the embodiment of the present disclosure.

FIG. 1 is a perspective view schematically illustrating a head lamp for a vehicle in accordance with an embodiment of the present disclosure, FIG. 2 is a configuration diagram schematically illustrating the head lamp for a vehicle in accordance with the embodiment of the present disclosure, FIG. 3 is a configuration diagram illustrating an example in which optical focuses are formed in the head lamp for a vehicle in accordance with the embodiment of the present disclosure, FIG. 4 is a configuration diagram illustrating another example in which optical focuses are arranged in a line in the head lamp for a vehicle in accordance with the embodiment of the present disclosure, and FIG. 5 is a configuration diagram illustrating an optical axis of light in the head lamp for a vehicle in accordance with the embodiment of the present disclosure.

Referring to FIGS. 1 to 5, the head lamp for a vehicle in accordance with the embodiment of the present disclosure includes a light source unit 10, an optic unit 20, a shield unit 30, a first lens array unit 40 and a second lens array unit 50.

The light source unit 10 emits light. As the light source unit 10, an LED may be applied.

The optic unit 20 controls the light, emitted from the light source unit 10, to be emitted to form a plurality of optical focuses F.

The shield unit 30 is disposed to form a cutoff line 33 on the plurality of optical focuses F. The light emitted by the optic unit 20 is divided into a low beam and a high beam by the cutoff line 33.

The first lens array unit 40 is disposed on an emission side of the shield unit 30, and has a plurality of first lenses 41 arranged therein. The first lenses 41 are arranged in a line or a plurality of lines. The first lens 41 is convex toward the shield unit 30, and has a larger curvature than a hemisphere. The first lens 41 slightly diffuses the emitted light to both sides based on an optical axis X.

The second lens array unit 50 is disposed on the emission side of the first lens array unit 40, and has a plurality of second lenses 51 arranged therein. The second lenses 51 are arranged in a line or a plurality of lines. The second lens 51 is convex toward the opposite side of the shield unit 30, and has a larger curvature than a hemisphere. The second lens 51 transmits the emitted light in a direction parallel to the optical axis X.

In accordance with the present disclosure, since the first and second lens array units 40 and 50 are applied to the head lamp, the size and manufacturing cost of an optical system can be significantly reduced. Furthermore, since a light distribution pattern is formed through the first and second lens array units 40 and 50, the degree of freedom in design of the head lamp can be improved, and a surface emission image can be freely implemented.

Since the shield unit 30 is disposed between the optic unit 20 and the first lens array unit 40 and the optic unit 20 emits light such that the plurality of optical focuses F are located at the shield unit 30, the plurality of optical focuses F may be calibrated to be located on one plane or close to one plane.

The shield unit 30 has a shield layer 31 formed on the surface thereof to form the cutoff line 33. The shield layer 31 is formed by depositing a light reflecting material. For example, the shield layer 31 is formed by depositing aluminum or chrome. Furthermore, the cutoff line 33 is formed at the corner of the shield layer 31.

More specifically, when the plurality of optical focuses F are located between the first lens array unit 40 and the second lens array unit 50, optical distortion occurs while the optical focuses F are away from the one plane as light penetrates the first lens array unit 40. In accordance with the embodiment of the present disclosure, however, since the optic unit 20 emits light to form the plurality of optical focuses F between the first lens array unit 40 and the optic unit 20, the plurality of optical focuses F may be located on the one plane or located very close to the one plane. Therefore, the plurality of optical focuses F may be calibrated to be located close to the first lens array unit 40, thereby increasing the diffusion angle of light. The diffusion angle indicates an inclination angle at which light is diffused on the X-Z plane.

The optic unit 20 includes an optic body 21 and an optic emission part 23.

The optic body 21 controls the light, emitted from the light source unit 10, to be emitted in parallel to one plane (X-Z plane). The optical angle of the light emitted from the optic body 21 is not changed.

The optic emission part 23 changes the optical angle of the light emitted from the optic body 21 such that the plurality of optical focuses F gather on one plane. The optic emission part 23 is an optical lens convex toward the shield unit 30.

The light emitted from the optic body 21 and the optic emission part 23 is divided into parallel light B1 whose optical axis X is parallel to the Z-axis and a plurality of polarized lights B2 to B4 whose optical axes are inclined with respect to the Z-axis. FIGS. 3 to 5 illustrate the parallel light B1 whose optical axis X is parallel to the Z-axis, the 10 degree polarized light B2 whose optical axis X2 is inclined by 10° with respect to the Z-axis, the 20 degree polarized light B3 whose optical axis X3 is inclined by 20° with respect to the Z-axis, and the 30 degree polarized light B4 whose optical axis X4 is inclined by 30° with respect to the Z-axis. However, the number and shape of the optic emission parts 23 may be modified to change the types of the polarized lights B2 to B4 in various manners.

When the optic unit 20 has no optic emission part 23 as a small optical lens, the light emitted from the optic body 21 is formed as the parallel light B1 whose optical angle is not changed. Therefore, the first and second lenses 41 and 51 have a limitation in increasing the diffusion angle of light. That is, when the optic unit 20 has no optic emission part 23, the diffusion angle of the light emitted from the second lens array unit 50 may be increased to about 20°. In the present disclosure, however, since the optic body 21 has the optic emission part 23, the optic emission part 23 may increase the diffusion angle of the light to about 30° by eccentrically changing the optical angle of the light.

The optic emission part 23 is formed as one body with the optic body 21. Therefore, the number of parts in the head lamp for a vehicle can be reduced. The optic emission part 23 may be manufactured separately from the optic body 21.

The optic emission part 23 may eccentrically form the optical axis X of light, which converges to some of the optical focuses F, at an angle of 20 to 30°. Since the optical axis X of light converging to some of the optical focuses F is eccentrically formed at an angle of 20 to 30°, the light emitted from the respective first lenses 41 may be emitted obliquely toward the second lenses 51 adjacent thereto.

The optic emission part 23 may adjust the optical angle to locate the plurality of optical focuses F on a straight line of one plane. Since the optic emission part 23 locates the plurality of optical focuses F on a straight line, the plurality of optical focuses F may be calibrated to be located closer to the first lens 41, thereby further increasing the diffusion angle of the light emitted through the first and second lenses 41 and 51. When the plurality of optical focuses F are calibrated to be located farther away from the first lens 41, the diffusion angle of the light emitted through the first and second lenses 41 and 51 may be further reduced. Therefore, depending on the design positions of the plurality of optical focuses F, the optic emission part 23 may be optically and suitably formed.

The first and second lenses 41 and 51 may correspond one-to-one to each other to form a lens set, and optical channels C1 and C2 are formed for the respective lens sets. Each of the optical channels C1 and C2 is formed in parallel to the Z-axis in the corresponding lens set.

The light converging to some of the optical focuses F penetrates the lens set and diffuses to the optical channel C1 or C2 adjacent thereto. For example, most of the parallel light and the 10 degree polarized light are emitted along the optical channel C1 or C2 of the corresponding lens set, and most of the 20 degree polarized light and the 30 degree polarized light are diffused obliquely to the optical channel C1 or C2 adjacent to the corresponding lens set. Therefore, the diffusion angle of the light having penetrated the first and second lenses 41 and 51 may be increased up to about 30°.

The optic emission part 23 is disposed at every two or more first lenses 41. The polarized light B2 corresponding to a part of the polarized lights formed by the optic emission part 23 may be emitted to the optical channel C1 or C2 facing the optic emission part 23, and the other polarized lights B3 and B4 may be diffused to the optical channel C1 or C2 which does not face the optic emission part 23.

Since the optic unit 20 emits light to form the plurality of optical focuses F between the first lens array unit 40 and the optic unit 20, the plurality of optical focuses F may be located on one plane or located very close to one plane. Therefore, the plurality of optical focuses F may be calibrated to be located close to the first lens array unit 40, thereby increasing the diffusion angle of light.

Furthermore, since the optic body 21 has the optic emission part 23, the optic emission part 23 may increase the diffusion angle of the light to about 30° by eccentrically changing the optical angle of the light.

Furthermore, since the diffusion angle of light emitted from the head lamp for a vehicle is increased to 30°, the head lamp may perform a welcome light function. The welcome light function refers to a function of emitting light around a vehicle or door such that a driver can visually recognize surroundings when approaching the vehicle or opening the door.

Furthermore, since the existing aspheric lenses do not need to be installed in the first and second lens array units 40 and 50, the size of the optical system can be significantly reduced. For example, when the aspheric lens is applied to the optical system of the head lamp, the optical system has a length of about 100 mm and a height of 50 mm. On the other hand, when the first and second lens array units 40 and 50 are applied to the optical system of the head lamp, the optical system may have a length of about 10 mm and a height of 12 mm.

Although preferred embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A head lamp for a vehicle, comprising:
a light source unit configured to emit light;
an optic unit configured to receive the light from the light source unit and to cause the light to form a plurality of optical focuses;
a shield unit disposed further away from the light source unit than the optic unit in a first direction and forming a cutoff line for the light emitted from the optic unit;
a first lens array unit disposed further away from the light source unit than the shield unit in the first direction; and
a second lens array unit disposed further away from the light source unit than the first lens array unit in the first direction,
wherein the light source unit, the optic unit, the shield unit, the first lens array unit, and the second lens array unit are arranged in order along the first direction,
wherein the first lens array unit comprises a plurality of first lenses, each of the plurality of first lenses comprising a convex incident surface facing the optic unit,
wherein the second lens array unit comprises a plurality of second lenses, each of the plurality of second lenses comprising a convex emission surface facing away from the optic unit,
wherein the plurality of first lenses and the plurality of second lenses are arranged to form a plurality of optical channels, wherein the plurality of optical channels are disposed side by side such that, in one of the plurality of optical channels, one of the plurality of first lenses and a corresponding one of the plurality of second lenses are aligned along the first direction.

2. The head lamp of claim 1, wherein the optic unit comprises:
an optic body configured to control the light, emitted from the light source unit, to be emitted in parallel to one plane; and
an optic emission part configured to change an optical angle of the light emitted from the optic body such that the plurality of optical focuses gather on the one plane.

3. The head lamp of claim 2, wherein the optic emission part is formed as one body with the optic body.

4. The head lamp of claim 2, wherein the optic emission part eccentrically forms an optical axis of light, which converges to some of the optical focuses, at an angle of 20 to 30°.

5. The head lamp of claim 2, wherein the optic emission part adjusts the optical angle such that the plurality of optical focuses are located on a straight line of the one plane.

6. The head lamp of claim 2, wherein the optic emission part adjusts focal distances of the plurality of optical focuses to adjust the diffusion angle of the light emitted from the first and second lenses.

7. The head lamp of claim 2, wherein the optic emission part is disposed at every two or more first lenses.

8. The head lamp of claim 1, wherein the shield unit has a shield layer formed on a surface thereof to form the cutoff line.

9. The head lamp of claim 1, wherein the optic unit comprises two or more optic emission protrusions formed on a light emission surface and disposed to correspond two or more of the plurality of first lenses.

* * * * *